United States Patent
Cook et al.

(10) Patent No.: US 8,482,574 B2
(45) Date of Patent: Jul. 9, 2013

(54) SYSTEM, METHOD, AND COMPUTER PROGRAM PRODUCT FOR CALCULATING STATISTICS ASSOCIATED WITH A SURFACE TO BE RENDERED UTILIZING A GRAPHICS PROCESSOR

(75) Inventors: David Robert Cook, San Jose, CA (US); Jacob Markovich Kurlyandchik, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 946 days.

(21) Appl. No.: 12/574,527

(22) Filed: Oct. 6, 2009

(65) Prior Publication Data

US 2011/0080420 A1 Apr. 7, 2011

(51) Int. Cl.
*G06T 15/00* (2011.01)
*G09G 5/00* (2006.01)

(52) U.S. Cl.
USPC .......................................... 345/581; 345/419

(58) Field of Classification Search
None
See application file for complete search history.

(56) References Cited

U.S. PATENT DOCUMENTS

| | | | |
|---|---|---|---|
| 2005/0066205 A1* | 3/2005 | Holmer | 713/320 |
| 2007/0130401 A1* | 6/2007 | Baker et al. | 710/62 |
| 2008/0143731 A1* | 6/2008 | Cheng et al. | 345/502 |

* cited by examiner

*Primary Examiner* — Carlos Perromat
(74) *Attorney, Agent, or Firm* — Zilka-Kotab, PC (57) ABSTRACT

A system, method, and computer program product are provided for calculating statistics associated with a surface to be rendered utilizing a graphics processor. In use, w-values are identified using a graphics processor. Additionally, the graphics processor is utilized for calculating statistics associated with at least one surface to be rendered using the w-values. Furthermore, the statistics are stored.

15 Claims, 8 Drawing Sheets

SYSTEM, METHOD, AND COMPUTER PROGRAM PRODUCT FOR CALCULATING STATISTICS ASSOCIATED WITH A SURFACE TO BE RENDERED UTILIZING A GRAPHICS PROCESSOR

FIELD OF THE INVENTION

The present invention relates to rendering surfaces, and more particularly to performing calculations in association with rendering surfaces.

BACKGROUND

Traditionally, information associated with surfaces to be rendered has been identified for performing various operations thereon utilizing software. For example, when surfaces are rendered stereoscopically, it is sometimes desirable to identify information capable of being used to adjust a depth of objects of the surface (e.g. for providing good perception of depth, etc.).

In the past, the information associated with surfaces to be rendered has been identified in software. For example, information associated with surfaces to be rendered was generally known since transformations occurred on such surfaces in software. Unfortunately, with more and more operations being performed on surfaces to be rendered in hardware, it has become increasingly difficult, if not impossible, to identify such information in software.

There is thus a need for addressing these and/or other issues associated with the prior art.

SUMMARY

A system, method, and computer program product are provided for calculating statistics associated with a surface to be rendered utilizing a graphics processor. In use, w-values are identified using a graphics processor. Additionally, the graphics processor is utilized for calculating statistics associated with at least one surface to be rendered using the w-values. Furthermore, the statistics are stored.

DETAILED DESCRIPTION

Figure 1:
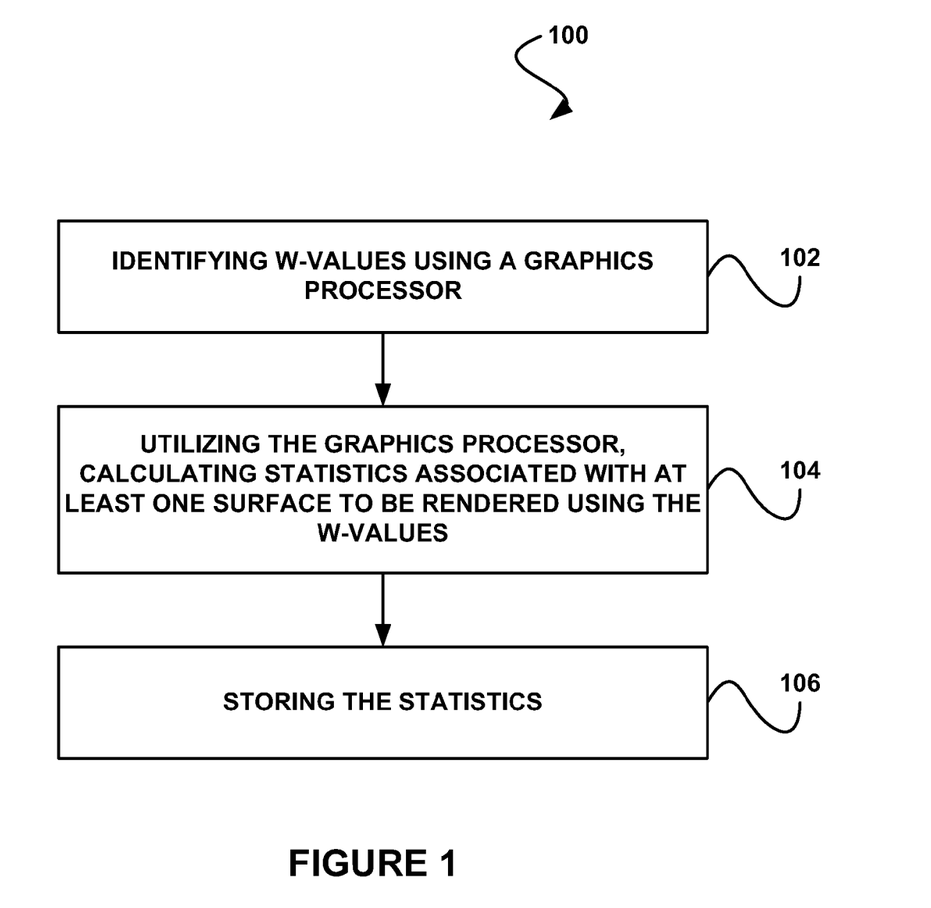
FIG. 1 shows a method for calculating statistics associated with a surface to be rendered utilizing a graphics processor, in accordance with one embodiment.

FIG. 1 shows a method 100 for calculating statistics associated with a surface to be rendered utilizing a graphics processor, in accordance with one embodiment. As shown in operation 102, w-values are identified using a graphics processor. In the context of the present description, the w-values may include any w-values associated with at least one surface to be rendered that are capable of being identified. Thus, the w-values may be associated with a single surface to be rendered or a plurality of surfaces to be rendered. More information regarding such surface will be described below with respect to operation 104.

In one embodiment, the w-values may be associated with objects in the surface to be rendered. In another embodiment, each of the w-values may be associated with a different one of the objects. For example, each of the w-values may indicate a depth of the object with which it is associated. The depth may include a depth with respect to a display device (e.g. monitor) via which the surface is to be displayed, as an option. In this way, the w-values may optionally include values indicating various depths associated with the surface.

It should be noted that the w-values may be identified in any desired manner which utilizes a graphics processor [e.g. a graphics processing unit (GPU), etc.]. Accordingly, the w-values may be identified in hardware. In one embodiment, the w-values may be identified during a transformation of the surface. In another embodiment, the w-values may be identified via processing of vertices in the surface (e.g. by the graphics processor), where the vertices are optionally vertices of objects in the surface. For example, the w-values may be extracted from such vertices.

Additionally, as shown in operation 104, utilizing the graphics processor, statistics associated with at least one surface to be rendered are calculated using the w-values. As noted above, the surface to be rendered may include any surface to be rendered via which the w-values may be identified. In various embodiments, the surface may include a portion of a scene, an entire scene, etc.

Further, the statistics associated with the surface are calculated prior to rendering of the surface, as also noted above. In one embodiment, the statistics may be calculated during transformation of the surface, since the w-values may optionally only be known during such transformation. Of course, however, the statistics may be calculated at any time before rendering of the surface in a manner that utilizes the graphics processor. To this end, the statistics may be calculated in hardware.

The statistics may include any calculations capable of being made using the graphics processor with respect to the identified w-values. For example, the statistics may be calculated by comparing w-values associated with objects in the surface. As described in more detail below, the comparison may be performed for identifying a nearest w-value at an outer edge of the surface, a nearest w-value at a center of the surface, a nearest w-value in an entirety of the surface, a farthest w-value in an entirety of the surface, etc.

In one embodiment, the statistics may include a nearest w-value at an outer edge of the surface (e.g. a w-value at the outer edge of the surface which includes the smallest depth). In another embodiment, the statistics may include a nearest w-value at a center of the surface (e.g. a w-value at the center of the surface which includes the smallest depth). In yet another embodiment, the statistics may include a nearest w-value in an entirety of the surface (e.g. a w-value with the smallest depth).

As an option, the nearest w-values indicated above may be calculated utilizing a z-buffer algorithm where the w-values are sorted based on depth. In this way, the w-values of each type (e.g. at the outer edge of the surface, at the center of the surface, of the entire surface, etc.) may be sorted for identifying the nearest w-value of each type.

As another option, the nearest w-values of each type may be calculated by comparing all w-values (e.g. of objects) of such type. For example, a register for temporarily storing the w-values may be utilized for comparing the w-values. The register may optionally be initialized with an infinite value for use in determining a nearest w-value. In one embodiment, vertices of the surface may be parsed to identify w-values of each type.

Upon identification of a first w-value, the first w-value may be stored in the register. Subsequently, a next w-value identified based on the parsing of the vertices may be compared to the w-value stored in the register. If the next w-value is nearer than the stored w-value, the next w-value may be stored. This comparison process may be performed for each identified w-value, such that the last w-value stored in the register may be identified as the nearest. It should be noted that the register may be used to store each particular type of w-value noted above, such that the comparison for identifying the nearest w-value may be performed for each particular type of w-value.

In a further embodiment, the statistics may include an average w-value for the surface. Thus, calculating the statistics may include averaging the identified w-values. The average w-value may optionally be calculated by summing all identified w-values and dividing the sum by a number of the identified w-values. As an option, the register described above may be utilized for storing the sum, such that the sum stored in the register may be updated as each w-value is identified. The register may optionally be initialized with a value of zero for use in determining the average w-value.

In another embodiment, the statistics may include a farthest w-value in an entirety of the surface (e.g. a w-value of the surface with the greatest depth). As an option, the register described above may be utilized for calculating the farthest w-value. The register may optionally be initialized with a value of zero for use in determining the farthest w-value.

For example, vertices of the surface may be parsed to identify w-values included therein. Upon identified of a first w-value, the first w-value may be stored in the register. Subsequently, a next w-value identified based on the parsing of the vertices may be compared to the w-value stored in the register. If the next w-value is farther than the stored w-value, the next w-value may be stored. This comparison process may be performed for each identified w-value, such that the last w-value stored in the register may be identified as the farthest.

Furthermore, the statistics are stored, as shown in operation 106. In one embodiment, the statistics may be stored in video memory (e.g. a register, a descriptor table, etc. of the video memory). For example, the statistics may be stored in video memory for each surface (or groups of surfaces) for which the w-values are identified. Of course, however, the statistics may be stored in any desired location. For example, the statistics may be stored by the graphics processor, such that the statistics may be stored in a location accessible to the graphics processor.

As another option, the statistics may be stored for use thereof in performing operations using the statistics. Accordingly, the statistics may optionally be stored in a location accessible to software (e.g. an application, a driver, etc.) to be used in performing such operations. To this end, the w-values may be identified and the statistics calculated in hardware utilizing the graphics processor, and the statistics may be stored for use thereof in software.

Just by way of example, the statistics may be stored for calculating a convergence value to be used in association with stereoscopic rendering of the surface. By using the statistics to calculate the convergence value, the convergence value may be dynamically adjusted for each surface (or groups of surfaces) to be rendered, according to the w-values identified for such surface. Such dynamic adjustment of the convergence value may ensure convergence is automatically customized in real-time for each surface for which w-values are identified, thus compensating for different views (e.g. resulting from different camera views, zoom functions, etc.) which may be applied to different surfaces (e.g. of a single application, game, etc.). Further, by implementing the calculating of the statistics in the graphics processor, automatic stereoscopic scene adjustment may be provided for optimal convergence without resulting in a significant reduction in performance during surface changes (e.g. game play, etc.).

In various embodiments, based on the real-time variable convergence value, the surface may be shifted forward enough to provide the best stereo effect, while still keeping the surface back enough to maintain objects of the surface in the screen (e.g. to prevent eye strain on a user viewing the surface). For example, if a statistic indicates that an object is clipped by an edge of the surface, the surface may be shifted back enough to ensure that the object is entirely in the surface. In one embodiment, the nearest w-value at the outer edge of the surface may be identified and compared to a zero parallax depth (ZPD) of the surface (e.g. a depth of an object at the monitor screen surface with zero separate from such monitor screen surface). The surface may then be shifted back by adjusting the convergence value according to the difference between the nearest w-value at the outer edge of the surface and the ZPD, as determined based on the comparison.

Optionally, the nearest w-value for the outer edge of the surface may be used to temper the convergence adjustment applied to the surface based on the nearest w-value for the entirety of the surface. For example, the nearest w-value for the outer edge of the surface may be used to dynamically adjust the convergence value for the surface unless it is determined that the nearest w-value for the entirety of the surface is too close to a viewer (e.g. is closer than a predetermined amount). If it is determined that the nearest w-value for the entirety of the surface is too close to a viewer, then the nearest w-value for the entirety of the surface may be used to dynamically adjust the convergence value, in a manner similar to that described above with respect to the nearest w-value for the outer edge of the surface.

As another example, if a statistic indicates that an object is too far back and may thus be moved forward without being clipped from the surface, the surface may be shifted forward enough move the object forward while ensuring that such object is not clipped from the surface. In one embodiment, the farthest w-value for the surface may identified and compared to the ZPD. The surface may then be shifted forward by adjusting the convergence value according to the difference between the farthest w-value of the surface and the ZPD, as determined based on the comparison. In another embodiment, the inverse of the nearest w-value at the outer edge of the surface may be made equal to ZPD, such that the entire surface may be brought up to the monitor screen in such a way as to avoid stereoscopic clipping at the surround which may product eyestrain, while producing the best perception of depth possible in the surface being displayed.

In another example, if a statistic indicates that a laser sight object at a center of the surface is being clipped from the surface, the surface may be shifted back enough to ensure that the laser sight object is entirely in the surface. In one embodiment, the nearest w-value for the center of the surface may identified and compared to the ZPD. The surface may then be shifted back by adjusting the convergence value according to the difference between the nearest w-value for the center of the surface and the ZPD, as determined based on the comparison.

In yet another example, if all objects of the surface are far away such that the surface may otherwise be shifted forward, the average w-value for the entire surface may be identified and compared to the farthest w-value for the entire surface. The surface may then be shifted forward by adjusting the convergence value according to the different between the average w-value for the entire surface and the farthest w-value for the entire surface, as determined based on the comparison. By using the average w-value for the entire surface, the surface may be prevented from being shifted forward an unwanted amount (e.g. when it is not desired, it is not the purpose of the surface, etc. to bring the surface close to the screen of the monitor).

It should be noted that the surface may be shifted forward and back at different rates. For example, the surface may be shifted forward at a rate that is slower (e.g. 3 seconds) than a rate at which the surface may be shifted back (e.g. 1 second). By using these different rates, eye strain of a viewer of the surface may be prevented.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
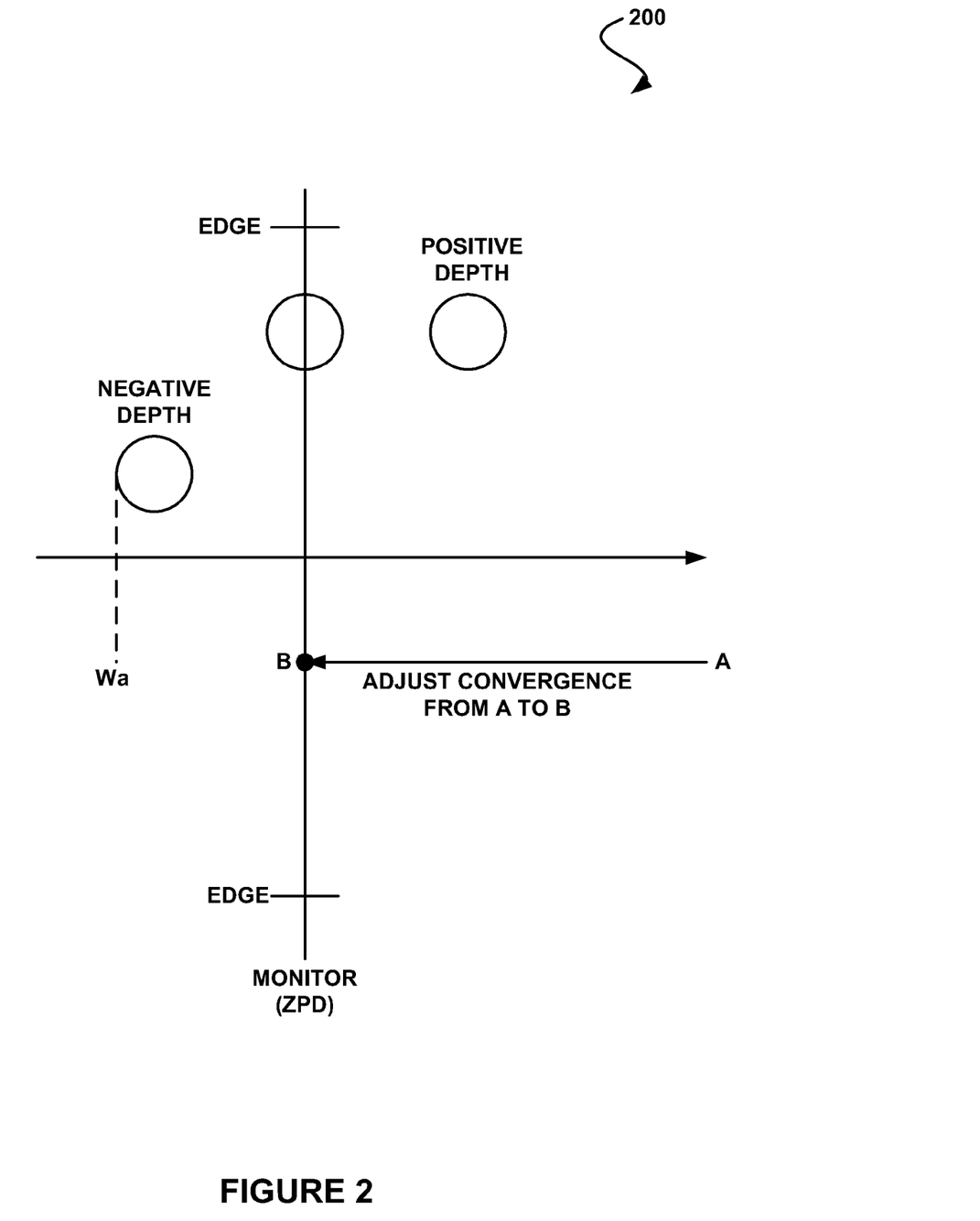
FIG. 2 shows a system in which objects are displayed with different separation with respect to a monitor, in accordance with another embodiment.

FIG. 2 shows a system 200 in which objects are displayed with different separation with respect to a monitor, in accordance with another embodiment. As an option, the present system 200 may be implemented to carry out the method 100 of FIG. 1. Of course, however, the system 200 may be implemented in any desired environment. It should also be noted that the aforementioned definitions may apply during the present description.

As shown, various objects (shown as circles) are located at various different separations (depths) with respect to the ZPD of the monitor. One object is located at a negative depth, such that the object is at a depth farther than the ZPD. Another object is located at a positive depth, such that the object is at a depth nearer than the ZPD. Yet another object is located at the ZPD.

Thus, with respect to the object located at the positive depth (e.g. assuming the object at the negative depth does not exist in the surface), it is desired to adjust the convergence value for the surface based on the difference between the positive depth at which the object is located and the ZPD (from point A to point B). By adjusting the convergence in this manner, the surface may be shifted such that the object located at the positive depth is accordingly shifted to be located at the ZPD.

As also shown, the object located at the negative depth may in one embodiment (not shown) be a nearest object for all objects located at the outer edge of the monitor (and thus clipped by the outer edge of the monitor). Thus, in such embodiment it is desired to adjust the convergence value based on the difference between the negative depth value at which the object is located and the ZPD. By adjusting the convergence in this manner, surface may be shifted such that the object located at the negative depth value may be shifted further away from the ZPD enough to result in the object being fully included in the surface.

Figure 3:
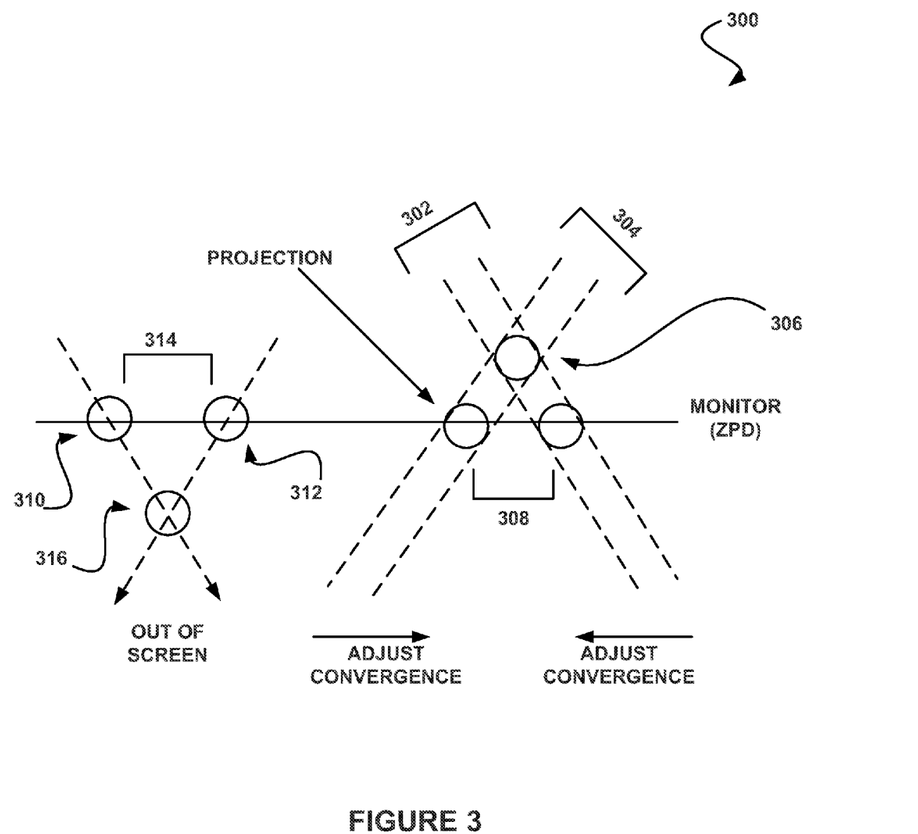
FIG. 3 shows a top down view of a system in which objects are displayed with different separation with respect to a monitor, in accordance with yet another embodiment.

FIG. 3 shows a top down view of a system 300 in which objects are displayed with different separation with respect to a monitor, in accordance with yet another embodiment. As an option, the present system 300 may be implemented in the context of the functionality and architecture of FIGS. 1-2. Of course, however, the system 300 may be implemented in any desired environment. Again, it should be noted that the aforementioned definitions may apply during the present description.

As shown, a left eye view 302 and a right eye view 304 of an object 306 at a positive depth are projected onto a monitor. The projection for each of the left eye view 302 and the right eye view 304 results in separation 308 at the ZPD between the left eye view 302 and the right eye view 304 of the object 306. Thus, the convergence of the object 306 may be adjusted to push the surface on which the object 306 is located back, such that the left eye view 302 and the right eye view 304 are projected closer together.

As also shown, another object 316 at a negative depth is projected onto the monitor such that a left eye view 310 and a right eye view 312 of the object 316 results in separation 314 at the ZPD between the left eye view 310 and the right eye view 312 of the object 316. Thus, the convergence of the object 316 may be adjusted to bring the surface on which the object 316 is located forward, such that the left eye view 310 and the right eye view 312 are projected closer together.

Figure 4:
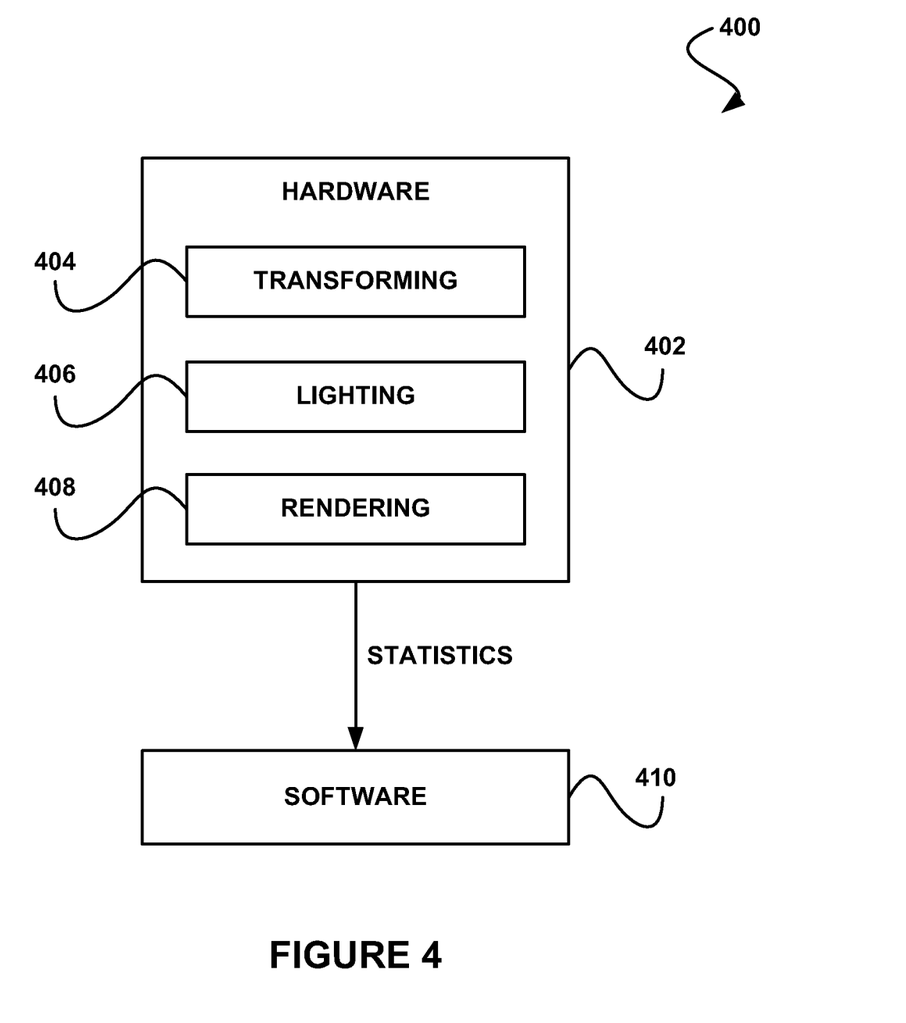
FIG. 4 shows a system in which statistics associated with a surface to be rendered are identified in hardware for use by software, in accordance with still yet another embodiment.

FIG. 4 shows a system 400 in which statistics associated with a surface to be rendered are identified in hardware for use by software, in accordance with still yet another embodiment. As an option, the present system 400 may be implemented in the context of the functionality and architecture of FIGS. 1-3. Of course, however, the system 400 may be implemented in any desired environment. Again, it should be noted that the aforementioned definitions may apply during the present description.

As shown, hardware 402 includes a plurality of modules 404-408 for performing operations on a surface to be rendered. For example, the hardware 402 may include, in part, a graphics processor. Such graphics processor may thus perform the operations on a surface to be rendered.

In one embodiment, the hardware 402 includes a transforming module 404. The transforming module 404 may be used to perform transformations on the surface to be rendered. The transformations may include processing vertices of objects in the surface to be rendered. For example, the transforming module 404 may operate on vertices in the surface to put them at the correct depth. In this way, w-values of objects in the surface to be rendered may be identified (via such vertices) during the transformation performed on the surface to be rendered.

Further, statistics may be calculated for the surface to be rendered, based on the identified w-values, using the transforming module 404. The statistics may include a nearest w-value at an outer edge of the surface, a nearest w-value at a center of the surface, a nearest w-value in an entirety of the surface, a farthest w-value in an entirety of the surface, etc.

While not shown, it should be noted that the statistics may be stored in the hardware 402. For example, the statistics may be stored in video memory. To this end, the statistics may be accessible by software 410. The software may optionally utilize the statistics for adjusting the surface to be rendered. For example, the statistics may be used for calculating a convergence value to be used in association with stereoscopic rendering of the surface.

In another embodiment, the hardware 402 includes a lighting module 406. The lighting module 406 may be utilized for performing lighting operations on the surface to be rendered. For example, lighting may be added to the surface to be rendered.

In yet another embodiment, the hardware 402 includes a rendering module 408. The rendering module 408 may create pixels to be displayed on a monitor, such that the surface is displayed. For example, the pixels may be created based on the transformed and lighted surface.

In addition, the rendering module 408 may render the surface based on data supplied by the software 410. For example, the rendering module 408 may render the surface based on the convergence value calculated by the software 410. In this way, the surface may be rendered such that a view of the surface is pushed forward or back based on the convergence value.

By allowing the software 410 to retrieve the statistics from the hardware 402 and adjust the surface to be rendered based on such statistics (e.g. by calculating a convergence value for the surface), a cost of the hardware may be reduced. For example, the hardware may be prevented from being relied upon to perform operations using the statistics, such as for calculating a convergence value for the surface.

Figure 5:
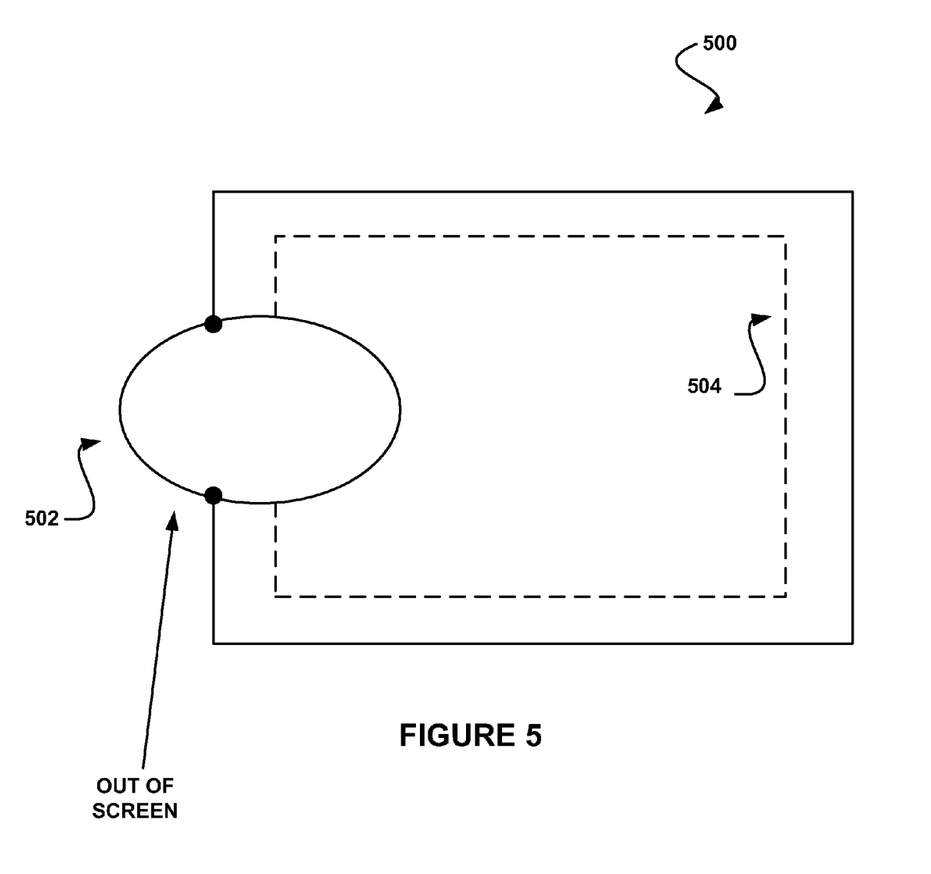
FIG. 5 shows a system in which a depth of an object results in the object being partially out of screen, in accordance with another embodiment.

FIG. 5 shows a system 500 in which a depth of an object results in the object being partially out of screen, in accordance with another embodiment. As an option, the present system 500 may be implemented in the context of the functionality and architecture of FIGS. 1-4. Of course, however, the system 500 may be implemented in any desired environment. Again, it should be noted that the aforementioned definitions may apply during the present description.

As shown, the system 500 includes a surface via which an object 502 is displayed. With the object 502 placed in the surface 500 at its current depth (a positive depth), the object 502 is clipped at the edge 504 of the surface 500. Thus, it is desired to adjust a convergence value for the surface 500 to shift the surface 500 back, such that clipping of the object 502 is prevented and thus an entirety of the object 502 is displayed in the surface 500.

As an option, the convergence value for the surface 500 may be adjusted according to a difference between a w-value of the object and the ZPD for a monitor on which the surface 500 is to be displayed. In this way, the surface 500 may be shifted back by the difference between the w-value of the object and the ZPD, such that the object 502 is brought to a depth equal to the ZPD, and clipping of the object 502 is prevented.

Figure 6:
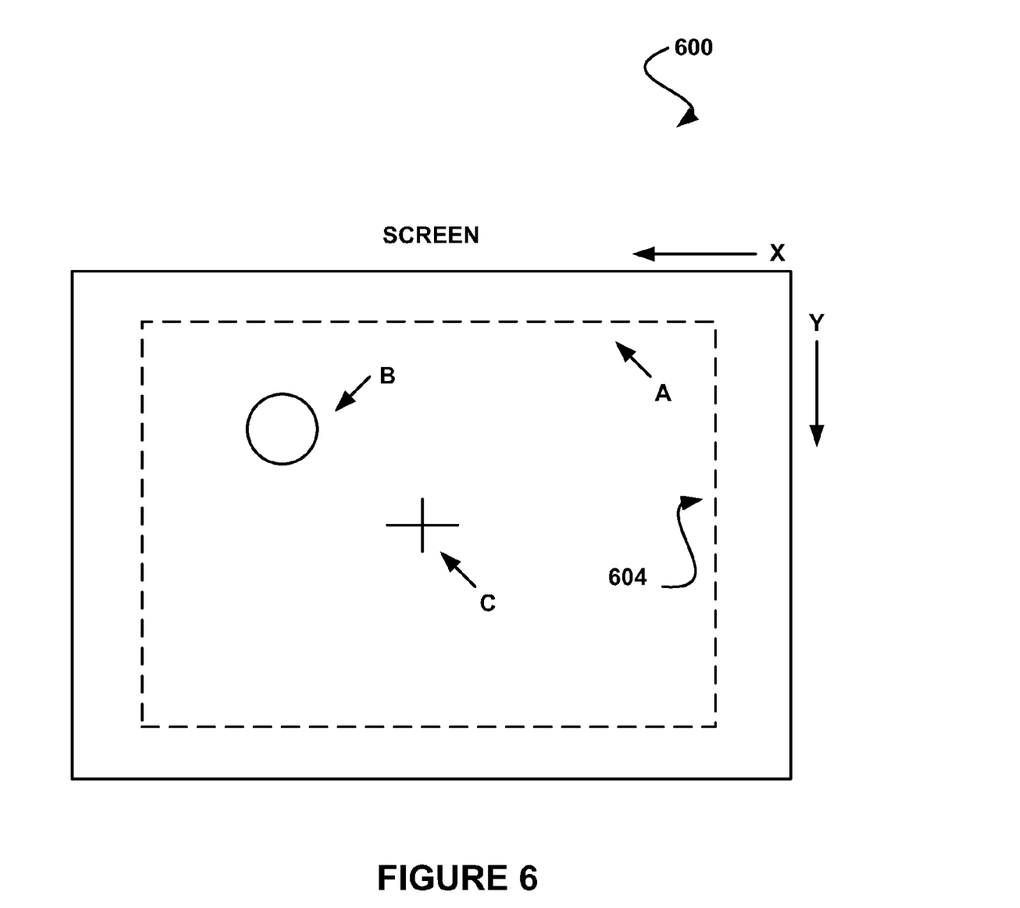
FIG. 6 shows a system in which objects displayed on a monitor are associated with different statistics, in accordance with another embodiment.

FIG. 6 shows a system 600 in which objects displayed on a monitor are associated with different statistics, in accordance with another embodiment. As an option, the present system 600 may be implemented in the context of the functionality and architecture of FIGS. 1-5. Of course, however, the system 600 may be implemented in any desired environment. Yet again, it should be noted that the aforementioned definitions may apply during the present description.

As shown, the system 600 includes a screen with X and Y coordinates via which a plurality of objects A-C is displayed. With respect to the present embodiment, the screen 600 may display a surface including the objects. A first object A includes a nearest object at an object an outer edge 602 of the surface. A second object B includes an object closest to the surface (with a smallest depth value). A third object C includes a center point of the surface.

Various statistics may be calculated based on the objects of the surface. In one embodiment, the statistics may include a w-value of the nearest object at the an outer edge 602 of the surface (object A). In another embodiment, the statistics may include a w-value of a nearest object for the entire surface (object B). In yet another embodiment, the statistics may include a w-value of the center of the surface (object C). In still yet another embodiment, the w-value may include an average w-value for all objects A-C of the surface.

Figure 7:
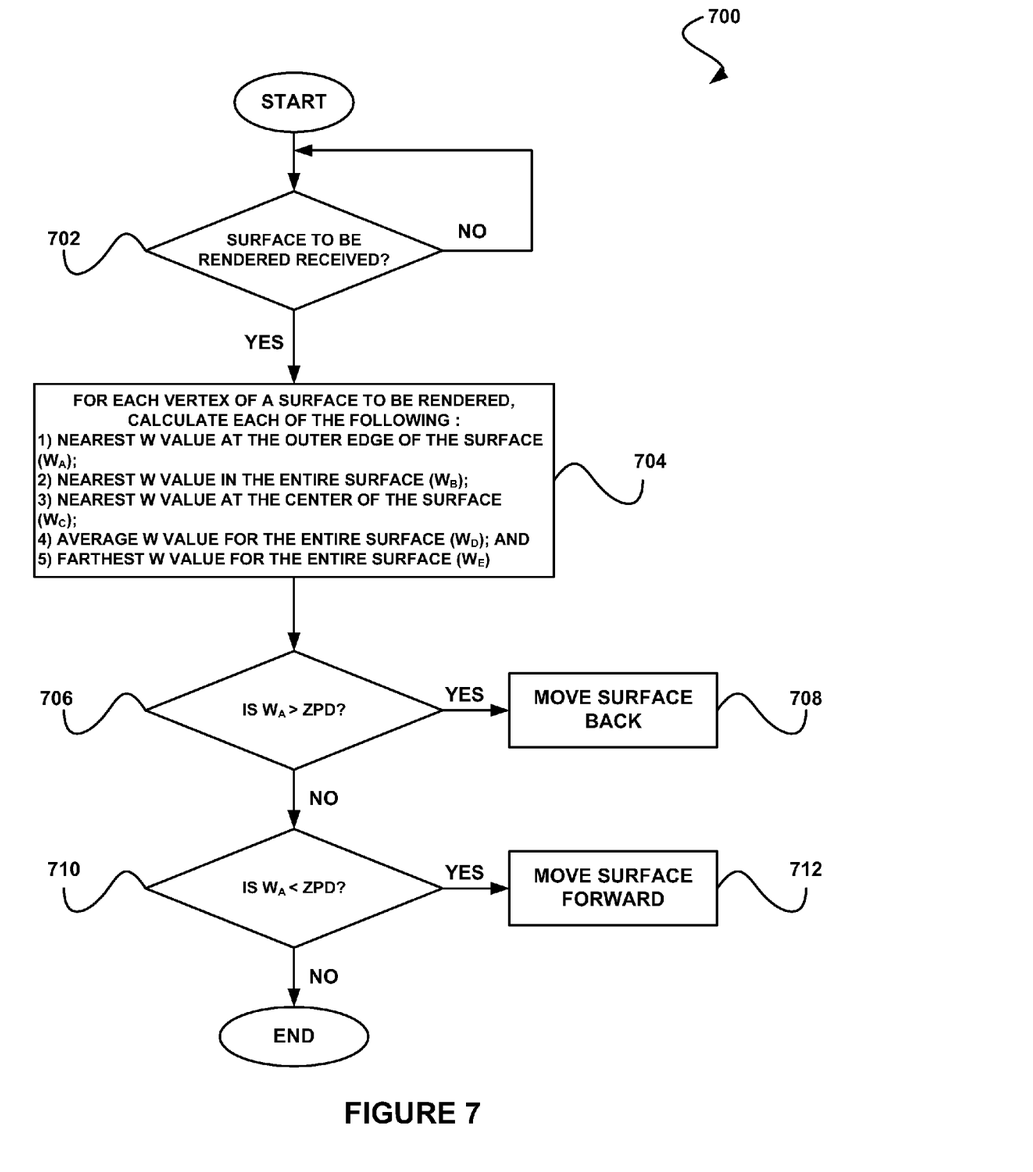
FIG. 7 shows a method for adjusting depth of a scene, in accordance with yet another embodiment.

FIG. 7 shows a method 700 for adjusting depth of a scene, in accordance with yet another embodiment. As an option, the method 700 may be carried out in the context of the functionality and architecture of FIGS. 1-6. Of course, however, the method 700 may be carried out in any desired environment. Again, it should be noted that the aforementioned definitions may apply during the present description.

As shown in decision 702, it is determined whether a surface to be rendered has been received. In one embodiment, the surface may include an initial surface (e.g. of video content, etc.) received for rendering (e.g. by a render pipe). Of course, however, the surface may include any surface received for rendering. For example, the surface may be received by a transforming module of hardware (e.g. for performing a transformation on the surface).

If it is determined that a surface to be rendered has not been received, the method 700 continues to wait for such a surface to be received. If, however, a surface to be rendered is received, a plurality of statistics is calculated for each vertex of the surface. See operation 704. The statistics include a nearest w-value at an outer edge of the surface, a nearest w-value in the entire surface, a nearest w-value at the center of the surface, an average w-value for the entire surface, and a farthest w-value for the entire surface. It should be noted that while only the nearest w-value at an outer edge of the surface is utilized with respect to the present embodiment for adjusting the surface, each of the different statistics may be utilized in different manners for adjusting the surface.

Further, it is determined whether the nearest w-value at the outer edge of the surface is greater than ZPD. See decision 706. If it is determined that the nearest w-value at an outer edge of the surface is greater than ZPD, the surface is moved back. See operation 708. In one embodiment, the surface may be moved back by adjusting a convergence value for the surface. For example, the convergence value may be adjusted based on a difference between the nearest w-value at an outer edge of the surface and the ZPD, such that the adjusted convergence value may compensate for such difference by pushing the surface back to the depth of the ZPD.

If, however, it is determined that the nearest w-value at an outer edge of the surface is not greater than ZPD, it is further determined whether the nearest w-value at an outer edge of the surface is less than ZPD. See decision 710. If it is determined that whether the nearest w-value at an outer edge of the surface is less than ZPD, the surface is moved forward. See operation 712.

In one embodiment, the surface may be moved forward by adjusting the convergence value for the surface. For example, the convergence value may be adjusted based on the difference between the nearest w-value at an outer edge of the surface and the ZPD, such that the adjusted convergence value may compensate for such difference by bringing the surface forward to the depth of the ZPD.

If it is determined that the nearest w-value at an outer edge of the surface is neither greater than ZPD (decision 706) nor less than ZPD (decision 710), the method 700 terminates. For example, a determination that the nearest w-value at an outer edge of the surface is neither greater than ZPD (decision 706) nor less than ZPD (decision 710) may indicate that the nearest w-value at an outer edge of the surface is equal to ZPD, such that no shifting of the surface may be necessary to move the surface closer to ZPD.

Figure 8:
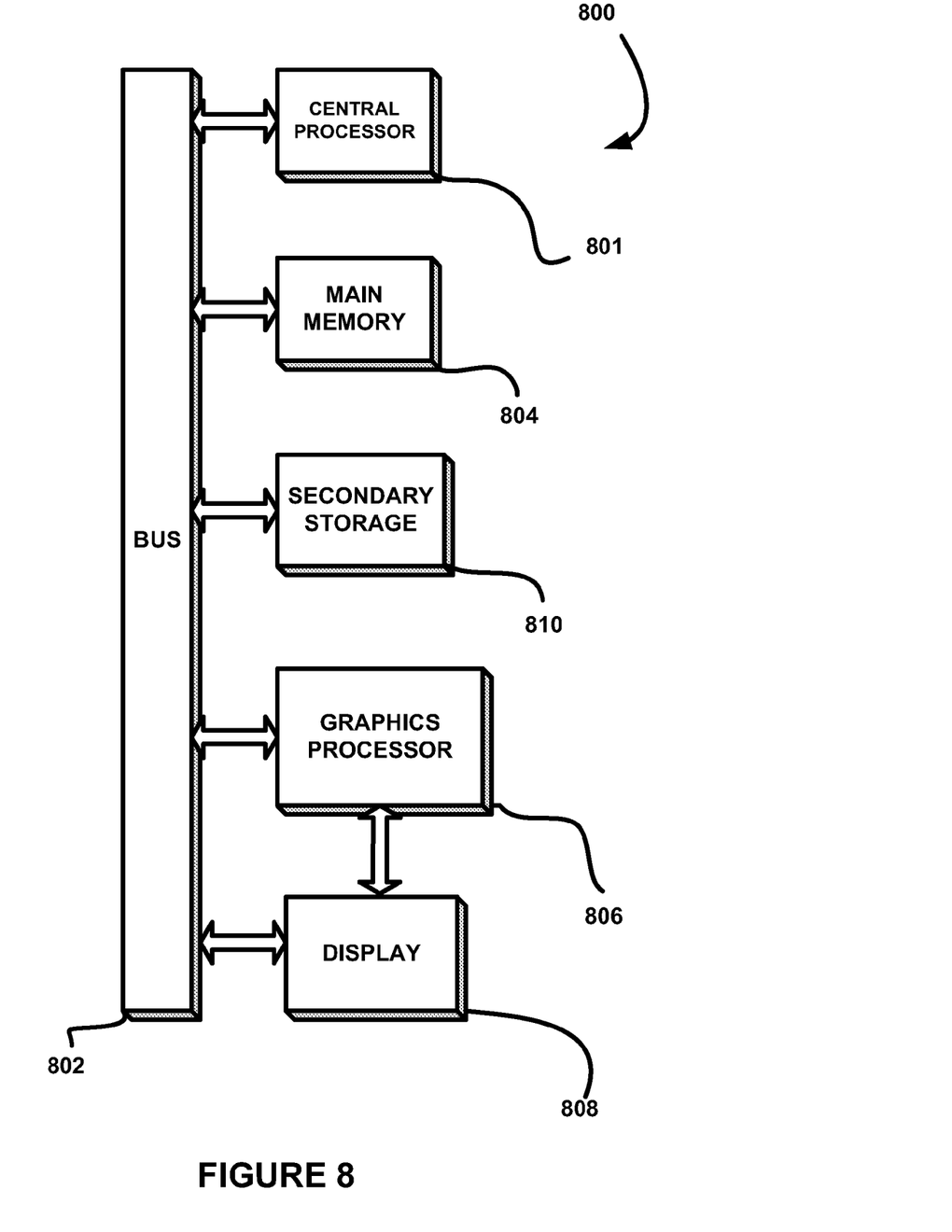
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one host processor 801 which is connected to a communication bus 802. The system 800 also includes a main memory 804. Control logic (software) and data are stored in the main memory 804 which may take the form of random access memory (RAM).

The system 800 also includes a graphics processor 806 and a display 808, i.e. a computer monitor. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804 and/or the secondary storage 810. Such computer programs, when executed, enable the system 800 to perform various functions. Memory 804, storage 810 and/or any other storage are possible examples of computer-readable media.

In one embodiment, the architecture and/or functionality of the various previous figures may be implemented in the context of the host processor 801, graphics processor 806, an integrated circuit (not shown) that is capable of at least a portion of the capabilities of both the host processor 801 and the graphics processor 806, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, lap-top computer, and/or any other type of logic. Still yet, the system 800 may take the form of various other devices m including, but not limited to a personal digital assistant (PDA) device, a mobile phone device, a television, etc.

Further, while not shown, the system 800 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying w-values using a graphics processor, wherein each w-value is associated with an object in at least one surface to be rendered and indicates a depth of the associated object;
calculating statistics associated with the at least one surface based on the w-values using the graphics processor; and calculating a convergence value to be used in association with stereoscopic rendering, of the at least one surface based on the statistics,
wherein calculating the statistics includes comparing w-values associated with objects in the at least one surface to identify at least one of a nearest w-value at an outer edge of the at least one surface, a nearest w-value in an entirety of the at least one surface, a nearest w-value at a center of the at least one surface, and a farthest w-value in an entirety of the at least one surface.

2. The method of claim 1, wherein the w-values are identified during transformation of the surface.

3. The method of claim 1, wherein the at least one surface includes at least a portion of a scene.

4. The method of claim 1, wherein the w-values are associated with a plurality of surfaces to be rendered.

5. The method of claim 1, wherein the statistics include a nearest w-value at an outer edge of the at least one surface.

6. The method of claim 1, wherein the statistics include a nearest w-value in an entirety of the at least one surface.

7. The method of claim 1, wherein the statistics include a nearest w-value at a center of the at least one surface.

8. The method of claim 1, wherein the statistics include an average w-value for the at least one surface.

9. The method of claim 1, wherein the statistics include a farthest w-value in an entirety of the at least one surface.

10. The method of claim 1, wherein calculating the statistics includes averaging the w-values.

11. The method of claim 1, wherein the statistics are calculated during transformation of the surface.

12. The method of claim 1, wherein the statistics are stored in video memory.

13. A graphics processor, comprising:
logic for identifying w-values using a graphics processor, wherein each w-value is associated with an object in at least one surface to be rendered and indicates a depth of the associated object;
logic for calculating statistics associated with the at least one surface to be rendered based on the w-values; and
logic for calculating a convergence value to be used in association with stereoscopic rendering of the at least one surface based on the statistics,
wherein calculating the statistics includes comparing w-values associated with objects in the at least one surface to identify at least one of a nearest w-value at an outer edge of the at least one surface, a nearest w-value in an entirety of the at least one surface, a nearest w-value at a center of the at least one surface, and a farthest w-value in an entirety of the at least one surface.

14. An apparatus comprising:
a graphics processor configured to:
identify w-values, wherein each w-value is associated with an object in at least one surface to be rendered and indicates a depth of the associated object, calculate statistics associated with the at least one surface to be rendered based on the w-values, and calculate a convergence value to be used in association with stereoscopic rendering of the at least one surface based on the statistics, wherein calculating the statistics includes comparing the w-values associated with objects in at least one surface to identify at least one of a nearest w-value at an outer edge of the at least one surface, a nearest w-value in an entirety of the at least one surface, a nearest w-value at a center of the at least one surface, and a farthest w-value in an entirety of the at least one surface.

15. The apparatus of claim 14, wherein the apparatus is operable such that the graphics processor remains in communication with memory and a display via a bus.

* * * * *